C. W. SPICER.
UNIVERSAL JOINT.
APPLICATION FILED MAY 6, 1913.
1,132,043.
Patented Mar. 16, 1915.
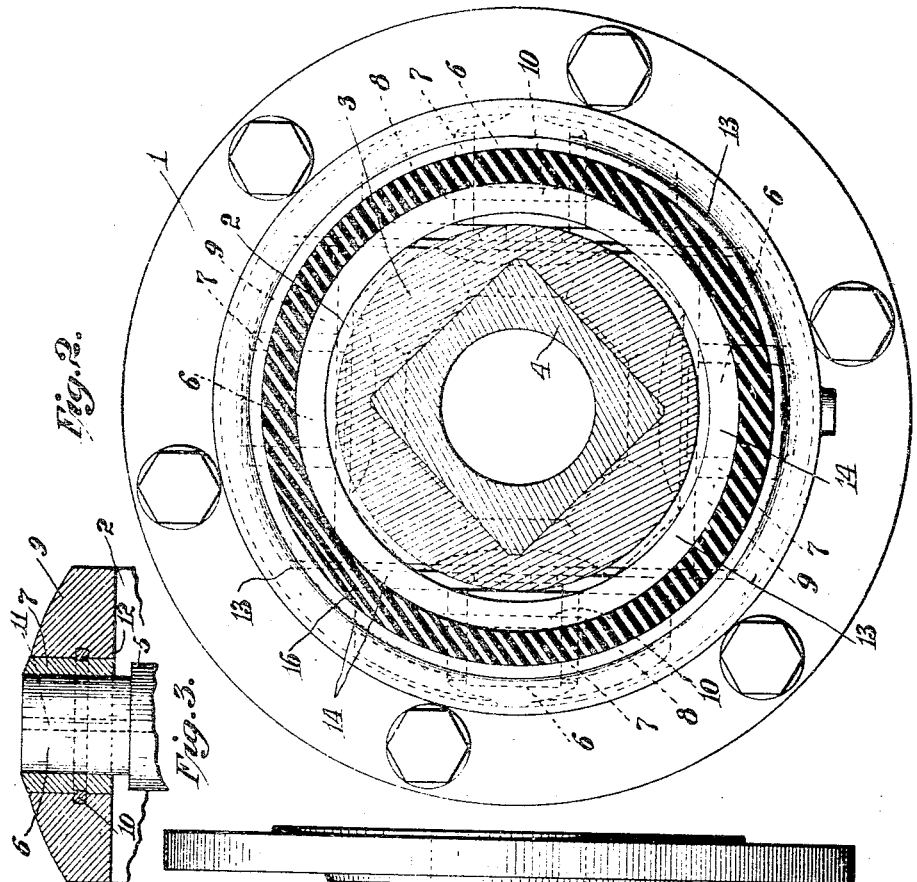
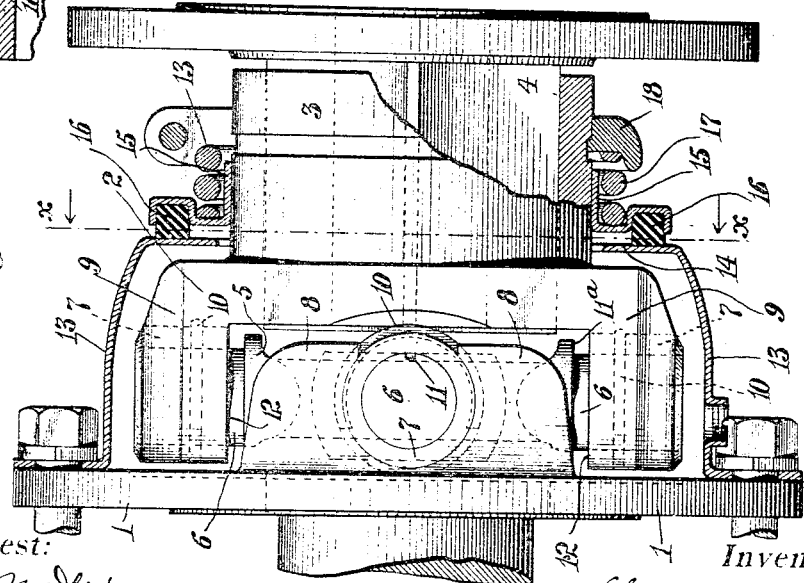
Attest:
*[signatures]*
Inventor:
*[signatures]*
Attys

UNITED STATES PATENT OFFICE.

CLARENCE W. SPICER, OF PLAINFIELD, NEW JERSEY.

UNIVERSAL JOINT.

1,132,043.   Specification of Letters Patent.   Patented Mar. 16, 1915.

Application filed May 6, 1913. Serial No. 765,826.

*To all whom it may concern:*

Be it known that I, CLARENCE W. SPICER, a citizen of the United States of America, and a resident of Plainfield, in the county of Union and State of New Jersey, have invented certain new and useful Improvements in Universal Joints, of which the following is a specification.

My invention relates to improvements in incased universal joints, and comprises an improved casing construction by means of which the working parts of such joint may be completely inclosed and the entry of dirt, dust, water, ice, etc., may be prevented and lubricant may be retained.

The objects of my invention are to provide a simple, compact and easily constructed incased universal joint adapted to transmit motion between members the axes of which do not intersect, and to provide a simple, compact, inexpensive and reliable casing for completely inclosing the working parts of such joint.

In the accompanying drawings, illustrating one embodiment of my invention, Figure 1 shows a side view and partial longitudinal section of an incased combined universal joint and slip joint embodying my invention, the inclosing casing of the joint being shown in section; and Fig. 2 shows a transverse section of the structure of Fig. 1 on the line $x$—$x$ of Fig. 1. Fig. 3 is a detail elevation and partial section through one of the horns and the corresponding bearing bushing, the journal pin being shown in elevation.

In the drawings, numeral 1 designates one of the two end members of the universal joint, and numeral 2 the other member of said joint, said member 2 comprising a hub portion 3 within which is an axial polygonal hole within which works a correspondingly shaped member 4; the structure 3—4 constituting a well known slip joint.

5 (Fig. 1) designates the trunnion block or intermediate member of the universal joint, this trunnion block having cylindrical journal pins 6—6 fitting within bushings 7 themselves fitting within recesses formed in horns 8 of end member 1 and horns 9 of end member 2; these bushings being provided with segmental rings 10 fitting within corresponding grooves of the horns 8, whereby the bushings are prevented from working out of the recesses of said horns. The journal pins 6 are free to oscillate in the bushings 7 and also to move axially therein.

The general construction of this universal joint is that of my Patent No. 826,448 in that bushings are provided between the journal pins of the trunnion block and the bearing-horns of members 1 and 2, but whereas in the construction shown in my Patent No. 826,448, the shoulders 11$^a$ of the trunnion block are practically in engagement at all times with the horns of the driving and driven members or end members of the joint, in the construction herein illustrated and described considerable play is provided between said shoulders 11$^a$ and the corresponding bearing surfaces 12 of the horns 8 and 9, with the result that member 2 of the joint may move a considerable distance, laterally, with respect to member 1; and vice versa; and such play is, in fact, provided, that the shoulders 11$^a$ do not come in contact with the horns 8 and 9 when the joint is used within the limits of lateral motion of members 1 and 2 for which it is designed. This capacity for a lateral, as distinguished from an angular, movement of the one end member of the universal joint with respect to the other end member thereof, and with respect to the trunnion block, adapts the universal joint for the transmission of motion between rotating members the axes of which do not intersect. In the transmission of motion between such members, not only is there the usual rocking motion or oscillation between the end members 1 and 2 and the trunnion block 5, but also there is a back and forth lateral motion of each end member, 1 and 2, with respect to the trunnion block 5, permitted as just above explained, by the play provided between the shoulders 11$^a$ and 12.

To accommodate the relative lateral motion of members 1 and 2, the main casing member, 13, secured to the end member 1 of the joint as shown, is provided with a bearing surface, 14, parallel to the plane of rotation of said member 1, and on the hub 3 of end member 2 is mounted a sleeve 15 carrying a packing ring 16 of elastic material, such as braided flax, which packing ring bears against the surface 14 of the casing member 13 and is pressed against such surface by a suitable spring 17 located between sleeve 15 and a suitable backing ring 18. Owing to the capacity of this packing ring 16 for compression, and owing to the fact that in practice sleeve 15 has a free fit on hub portion 3, free angular motion of member 2 with reference to member 1 is permitted within reasonable limits; the universal joint being, therefore, adapted both for the transmission of motion between members the axes of which do not intersect, and for the transmission of motion between members the axes of which are angularly related whether such axes intersect or not.

Oil channels 11 are provided in the journal pins 6 for the distribution of lubricant over the wearing surfaces of the journal pins and bearing bushings.

In a companion application for Letters Patent Sr. No. 765,825, now Patent No. 1,095,430, dated May 5, 1914, I have illustrated and described another universal joint adapted for the transmission of motion between rotating members the axes of which do not intersect, and another form of inclosure for such joints, which inclosure is likewise adapted for use with the joint herein illustrated and described.

What I claim is:—

An incased universal joint comprising a universal joint proper, a casing member inclosing said universal joint and secured to one of the members thereof, and having a portion turned toward the axis of rotation, the face of such portion being parallel to the plane of rotation of such casing member, and having in it an opening through which another member of such universal joint projects, and closing means for such opening carried by such other member of the universal joint and comprising packing bearing against the said face of said casing member, and means tending to force said packing against the said face of said casing member.

In testimony whereof I have signed this specification in the presence of two subscribing witnesses.

CLARENCE W. SPICER.

Witnesses:
JOHN LEE,
ROLAND M. DAVIS.

Copies of this patent may be obtained for five cents each, by addressing the "Commissioner of Patents. Washington, D. C."